United States Patent [19]

Singh

[11] 3,909,364
[45] Sept. 30, 1975

[54] WASTE DISPOSAL METHOD AND APPARATUS

[76] Inventor: Alamjit D. Singh, P.O. Box 1679, Chicago, Ill. 60690

[22] Filed: Apr. 24, 1974

[21] Appl. No.: 463,551

Related U.S. Application Data

[63] Continuation of Ser. No. 251,932, May 10, 1972, abandoned.

[52] U.S. Cl. .................... 201/2.5; 201/7; 201/16; 201/21; 201/25; 201/31; 202/99
[51] Int. Cl.² ................ C10B 51/00; C10B 57/04; C10B 21/20
[58] Field of Search .......... 201/2.5, 7, 13, 14, 15, 201/16, 21, 22, 23, 24, 25, 31, 38; 202/99

[56] References Cited
UNITED STATES PATENTS

| | | | |
|---|---|---|---|
| 2,741,549 | 4/1956 | Russell | 201/31 |
| 3,437,562 | 4/1969 | Singh | 201/22 |
| 3,714,038 | 1/1973 | Marsh | 201/21 |
| 3,733,183 | 5/1973 | Singh | 201/22 |
| 3,734,833 | 5/1973 | Singh | 201/23 |
| 3,736,233 | 5/1973 | Sass et al. | 201/22 |

*Primary Examiner*—Norman Yudkoff
*Assistant Examiner*—D. Sanders
*Attorney, Agent, or Firm*—Olson, Trexler, Wolters, Bushnell & Fosse, Ltd.

[57] ABSTRACT

The structures herein set forth comprise a method and apparatus for the disposal of waste. Municipal wastes such as garbage, trash and the like are transmitted to separator and shredder devices. The carbonizable portions thereof which may be agricultural, forest or animal, are transmitted, along with sanitary sludge cake, into a drier. After a partial drying operation the material is mixed with coal and coal char, and optionally with oil char and the like, and transmitted to a devolatilizer and heat generator assembly wherein the carbonizable portions of the waste are combined with coal and coal char, and optionally with oil char, whereby to provide a combined char suitable for fuel. The by-products provided by the process are recovered.

14 Claims, 1 Drawing Figure

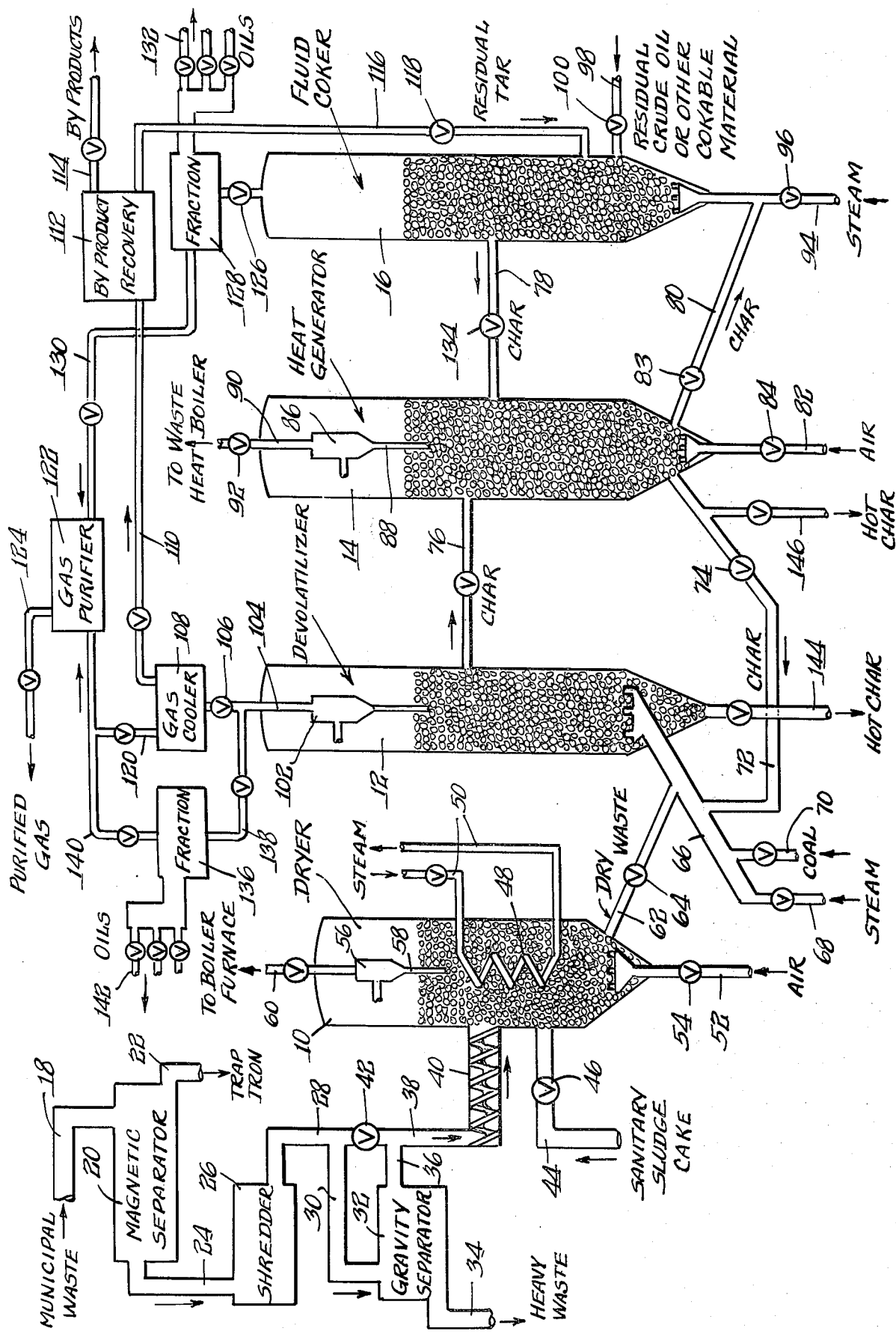

WASTE DISPOSAL METHOD AND APPARATUS

This is a continuation of application Ser. No. 251,932, filed May 10, 1972, now abandoned.

This invention relates to methods and apparatus for the disposal of waste, particularly municipal waste and/or sanitary sludge cake.

The disposal of municipal waste, composed largely of garbage and trash, presents an ever-increasing problem. Such material is collected in large volume in urban centers, and its disposal presents a continuously increasing problem. In accordance with conventional methods, such waste is buried or it is burned. Suitable sites for burial or for use as fill, are frequently not conveniently available, and burning is generally difficult and expensive. The garbage and trash collected frequently contains considerable amounts of moisture, particularly when collected on wet days, which makes burning difficult. Generally the process must be conducted in incinerators, fired by auxiliary fuel, such as gas, and the process is both expensive and emits noxious fumes into the atmosphere.

The disposal of human waste also presents a problem. In urban developments this is usually collected, as sewage, and transmitted to treatment plants where it is subjected to treatment, usually as activated sludge. The residue, known as sanitary sludge cake, also presents a disposal problem. It may be burned, but usually this is not feasible in urban areas. When sufficiently dried, it may be transported and used as fertilizer but frequently this is not economic or otherwise feasible.

In accordance with the present invention, methods and apparatus are provided for the treatment both of municipal waste and sanitary sludge cake, so as to convert the carbonizable portions thereof into a char suitable for use as a fuel. In accordance with the invention the waste material is combined with coal and coal char, and optionally with oil char, so as to provide a combined char of the waste material, and the coal and the oil, suitable for use as fuel. The by-products produced from the process are recovered. The carbonaceous product or combined char which is produced, may be made suitably low in sulphur, and is suitably combustible in ordinary furnaces. By these means the process is made desirably economic.

It is an object of the present invention to provide a process and apparatus for disposing of municipal waste and sanitary sludge cake in a more feasible and economic manner.

A further object of the invention is to provide a method and apparatus for disposing of municipal waste and sanitary sludge cake, which is desirably economic, and which may be feasibly carried out; and which provides a combined carbonaceous char which is readily usable as fuel, and which has an acceptably low sulphur content.

A further object of the invention is to provide, in a process and apparatus as set forth, means for collecting the by-products produced, whereby to enhance the economics of the system.

A still further object of the invention is to provide, in a process and apparatus as set forth, for the use of relatively low cost charging materials such as lower cost coal and oil, whereby to enhance the economics of the system.

Various other objects, advantages and features of the invention will be apparent from the following specification, when taken in connection with the accompanying drawing, wherein a preferred embodiment is set forth for purposes of illustration.

Referring more specifically to the drawing, there is set forth therein, diagrammatically, suitable apparatus for carrying out the process of the present invention. The apparatus comprises, in general, a drier diagrammatically indicated by the reference numeral 10, a coal devolatilizer 12, a heat generator 14, and a fluid coker 16 suitable for coking crude oil, or other suitable cokable material.

Municipal waste, which as above stated is usually composed of garbage and trash, is shown as being introduced into the system by means of a conduit 18. The waste material is first transmitted to a magnetic separator 20 wherein magnetizable material such as iron and the like is separated out and ejected through a conduit or discharge 22. The waste material from which the iron has been separated is then transmitted by means of a conduit 24 to a shredder diagrammatically indicated at 26. Within the shredder, which may be of any suitable construction, the waste material is broken into relatively small pieces, and then tramsmitted by means of conduits 28 and 30 to a gravity separator, as indicated at 32.

The gravity separator may be of any known design, but preferably is of the type which uses air activated granular material so as to provide a continuously movable fluid bed through which heavier material gravitates, and thus separated from the fractions of lighter specific gravity. The heavier weight material such as non ferrous metal particles, broken bottles and glass and the like, are indicated as being transmitted to the discharge 34, the remaining material which will be composed largely of garbage, paper, cardboard boxes, and other carbonizable material being transmitted through conduits 36 and 38 to a screw feed device as indicated at 40. A valved bypass conduit is indicated at 42, which may be used for bypassing the gravity separator when desired.

By means of the screw conveyor 40, the carbonizable waste material is introduced into the drier 10.

Sanitary sludge cake is also introduced into the drier, by means of a conduit 44, under control of a valve 46.

Within the drier 10 the comminuted waste material is subjected to at least a partial drying operation by suitable heating means. In the particular embodiment shown such heating means comprises a steam coil 48 disposed within the embedded material. The steam coil is supplied with live steam from a suitable valved conduit system as indicated at 50.

Air is introduced into the base of the drier from a conduit 52, under control of a valve 54, there being disposed in the upper portion of the drier a cyclone-type dust separator 56. Within the dust separator the gases emitted from the waste material mass are separated, solids being returned to the mass through a conduit 58, and the gases being transmitted through a valved conduit 60 to a boiler furnace or the like from which the sensible heat and the heat from combustion of any combustible fractions is recovered.

The dry, or relatively dry, comminuted waste material is transmitted through a conduit 62, under control of a valve 64, to an inlet conduit 66 leading to the devolatilizer 12.

In the particular embodiment of the invention shown, conduit 66 is supplied with steam from a valved conduit 68, with granular coal through a conduit 70, and with hot char through the conduit 72 supplied from the heat generator under control of a valve 74.

The solid waste and coal devolatilizer 12, the heat generator 14, and the oil fluid coker 16, may be of the general type and kind set forth in the patent to A. D. Singh U.S. Pat. No. 3,437,562 dated Apr. 8, 1969. As is set forth in said patent, the hot char or mix within the system is interchanged between the devolatilizer, the heat generator, and the fluid coker, in a manner so as to provide a carbonaceous product, or char, the individual particles of which are comprised of both coal char and oil fluid coke. As is set forth in the drawing herein, the recirculation system comprises a valved conduit 76 interconnecting the devolatilizer and the heat generator, and a valved conduit 78 interconnecting the heat generator and the oil fluid coker. A conduit for char is also provided between the heat generator and the oil fluid coker, as indicated at 80, under control of a valve 82. As is set forth in said patent, there is a partial burning of the carbonaceous material within the heat generator, whereby to supply heat to the devolatilizer and the oil fluid coker, to effect the proper functioning thereof.

An important aspect of the present invention is the manner in which the comminuted waste material is intermixed with the granular coal from the conduit 70, and the granular hot char from the conduit 72, upon introduction into the devolatilizer, whereby to provide a proper fluidized bed. In the conventional burning of municipal waste, or in the attempted burning thereof by conventional methods, the waste material produced results in the formation of ash and fly ash, and other unburned pollutants, and it is difficult if not impossible to maintain a proper fluidized bed. In accordance with the present apparatus and method, the mixing of the comminuted waste with the coal and the hot char permits a proper fluidized bed to be maintained at the base of the devolatilizer, so as to effect a proper carbonizing action.

Referring further to the heat generator, combustion air to effect the partial burning or combustion of the char therewithin, is supplied through a conduit 82 under control of the valve 84, there being a cyclone dust separator in the upper portion of the heat generator, as indicated at 86, functioning in a manner of the dust separator 56 within the drier, as previously described. Solid material is returned to the char mass within the heat generator, from the separator, through a conduit 88, the gaseous fraction being transmitted through conduit 90 under control of a valve 92 to a waste heat boiler. The gases transmitted through conduit 90 will have considerable sensible heat, and some combustible fractions such as CO, this heat thus being recoverable within the waste heat boiler.

Referring more particularly to the oil fluid coker 16, the hot char from the heat generator, transmitted from conduit 80, is introduced into the fluid coker by means of a steamline 94, under control of a valve 96. Charging material is introduced into the fluid coker by means of a conduit 98 under control of a valve 100. As indicated, such charging material may comprise residual oil, or so-called resid, or crude oil, or other suitable cokable material. One form of charging material which advantageously may be used is crude oil emulsified with water which generally can be purchased at very low cost because the removal of the emulsified water is so costly as to make the product essentially unusable. In accordance with the present process such crude oil may be charged into the oil fluid coker, along with live steam from the conduit 94, an automatic separation of the moisture being effected by the present process, so that the presence of such moisture within the oil does not comprise or constitute a disadvantage.

Likewise, in accordance with the present process, relatively low cost coal may be used, by reason of the fact that the waste material is low in sulphur, so that when it is mixed with coal having a relatively high sulphur content, an acceptably low sulphur content for the combined material may be achieved. Higher sulphur coal, which is less costly, thus may be advantageously used.

In accordance with the present invention, the by-products resulting from the process are recovered, for further economic advantage. As shown, the volatile products from the devolatilizer are transmitted to a separator 102, functioning in the manner of the separators 56 and 86 previously described, the discharge from the separator being transmitted by means of a conduit 104, under control of a valve 106, to a gas cooler as indicated at 108. Within the cooler, tar from the volatile mix is separated and transmitted by means of a conduit 110 to a by-product recovery chamber 112, from which the by-products recovered from the tar are transmitted to use, through a valved conduit 114. The residual tar is transmitted from the by-product recovery chamber through conduit 116, under control of a valve 118, to be thereby returned to the oil fluid coker. In instances wherein the fluid coker may be omitted, conduit 116 may return directly to the devolatilizer. Also, the charging material to the fluid coker from conduit 98 may, if desired, lead directly to the devolatilizer 12.

The gas from the cooler 108 is transmitted by means of a valved conduit 120 to a gas purifier 122. Purified gas is transmitted therefrom, to a station for use, through a valved conduit 124.

The volatile fractions from the oil fluid coker in the embodiment shown are transmitted through a valved conduit 126 to a fractionator diagrammatically indicated at 128. Within the fractionator oils are fractionated and are separated from the gas, the gas being transmitted to the gas purifier through a valved conduit 130, and the franctionated oils being transmitted to discharge, for use, as indicated at 132.

In the system as set forth the use of the oil fluid coker is optional even with the piping system unchanged, it being possible to cut it away from the system by closing of the valves 83 and 134, associated respectively with the conduits 80 and 78. When the oil fluid coker is not being used, the discharge from the devolatilizer may be transmitted to a fractionator 136, through a valved conduit 138, the fractionator 136 functioning in the manner of the fractionator 128 previously described. The gaseous discharge from the fractionator 136 may be transmitted to the gas purifier by means of a valved conduit 140, the fractionated oil being transmitted to discharge for use, as indicated by the reference numeral 142, or the heavy bottoms from the tar fractionator being returned to the devolatilizer through suitable piping to be further processed to extinction.

The utilization of the fluid coker, where oil or the like is available, is preferred, because the oil may be rich in volatile by-products, thus improving the economics of the system.

Further, the oil, the coal, and the waste material produce a combined carbonaceous char granular material, well adapted for use as a fuel for furnace combustion purposes. The oil is higher in BTU content and lower in ash, as compared with coal. On the other hand, the coal char is more readily combustible; whereas the char from the waste material is generally lower in sulphur. In particular, the granular coal provides a carbonaceous char base with which the char from the oil or other cokable material, and the char from the waste, may be combined, and upon which the char granules may be built up, whereby to provide a combined carbonaceous material or combined char the individual particles of which are combined coal char, oil char and waste material char, and are possessed of the desirable burning characteristics of the three components of the system, or of the two components in the event the oil is not used. An important characteristic, as heretofore described, is the maintenance of a proper fluidized bed within the devolatilizer so as to effect the desirable carbonizing action of the waste material.

The hot combined char may be variously withdrawn, and as shown, may be withdrawn from the devolatilizer through a valved discharge conduit 144 and/or from the conduit 72 from the heat generator by means of a valve conduit 146.

As will be understood, the drier vessel 10, although preferred, may be eliminated, and the waste material comprising the municipal waste and/or the sanitary sludge cake introduced directly into the devolatilizer 12. Similarly, the fluid coker vessel 16 may be eliminated if desired, although its use is preferred, and the charging material thereto introduced directly into the heat generator 14.

The invention is claimed as follows:

1. The method of treating carbonizable waste selected from the class consisting of garbage and sanitary sludge cake which comprises mixing the waste with coal within a carbonizing chamber, and subjecting the mix to the action of heat while in said chamber by mixing hot coal char taken from a separate combustion source therewith whereby to provide a carbonaceous char, the individual particles of which comprise coal char and the carbonized waste.

2. The method of treating carbonizable waste as defined in claim 1 wherein oil is added to the system.

3. The method of treating carbonizable waste as defined in claim 1 wherein the carbonizable waste and the coal are in granular form when mixed.

4. The method of treating carbonizable waste as defined in claim 1 wherein volatile by-products are extracted from the mix during the heating operation.

5. The method of treating carbonizable waste as defined in claim 2 wherein volatile by-products are extracted from the mix during the heating operation.

6. The method of treating carbonizable waste as defined in claim 1 wherein the heat is supplied by a partial burning of the carbonaceous char.

7. The method of treating carbonizable waste as defined in claim 1 wherein the waste is subjected to a preliminary treatment which comprises a shredding operation.

8. The method of treating carbonizable waste as defined in claim 1 wherein the waste comprises garbage.

9. The method of treating carbonizable waste as defined in claim 1 wherein the waste comprises sanitary sludge cake.

10. Apparatus for treating carbonizable waste selected from the class consisting of garbage and sanitary sludge cake comprising a devolatilizer, means forming a source of comminuted waste, means for transmitting comminuted waste from said source to the devolatilizer, means forming a source of granular coal, means for transmitting granular coal from said source to the devolatilizer, means including a combustion chamber providing a source of hot coal char, and means for subjecting the coal and the waste to the action of hot coal char from said combustion chamber within the devolatilizer to form a char the individual particles of which comprise combined coal char and carbonized waste.

11. Apparatus for treating carbonizable waste as defined in claim 10 wherein means is provided for transmitting oil to the devolatilizer.

12. Apparatus for treating carbonizable waste as defined in claim 10 wherein the means for subjecting the coal and waste to the action of heat comprises a heat generator interconnected with the devolatilizer and within which the coal char and waste material char are partially burned.

13. Apparatus for treating carbonizable waste as defined in claim 10 wherein means is provided for extracting volatile materials from the devolatilizer during the heating action.

14. Apparatus for treating carbonizable waste as defined in claim 10 wherein a drier is provided within which the waste material is partially dried prior to transmission to the devolatilizer.

* * * * *